Aug. 22, 1939.  J. W. SHEPERDSON  2,170,255
SHEARING OF MATERIAL
Filed May 25, 1937  4 Sheets-Sheet 1

INVENTOR
JOHN W. SHEPERDSON
By Albert G. Blodgett
ATTORNEY

Aug. 22, 1939.                J. W. SHEPERDSON                2,170,255
                                SHEARING OF MATERIAL
                                Filed May 25, 1937            4 Sheets-Sheet 2
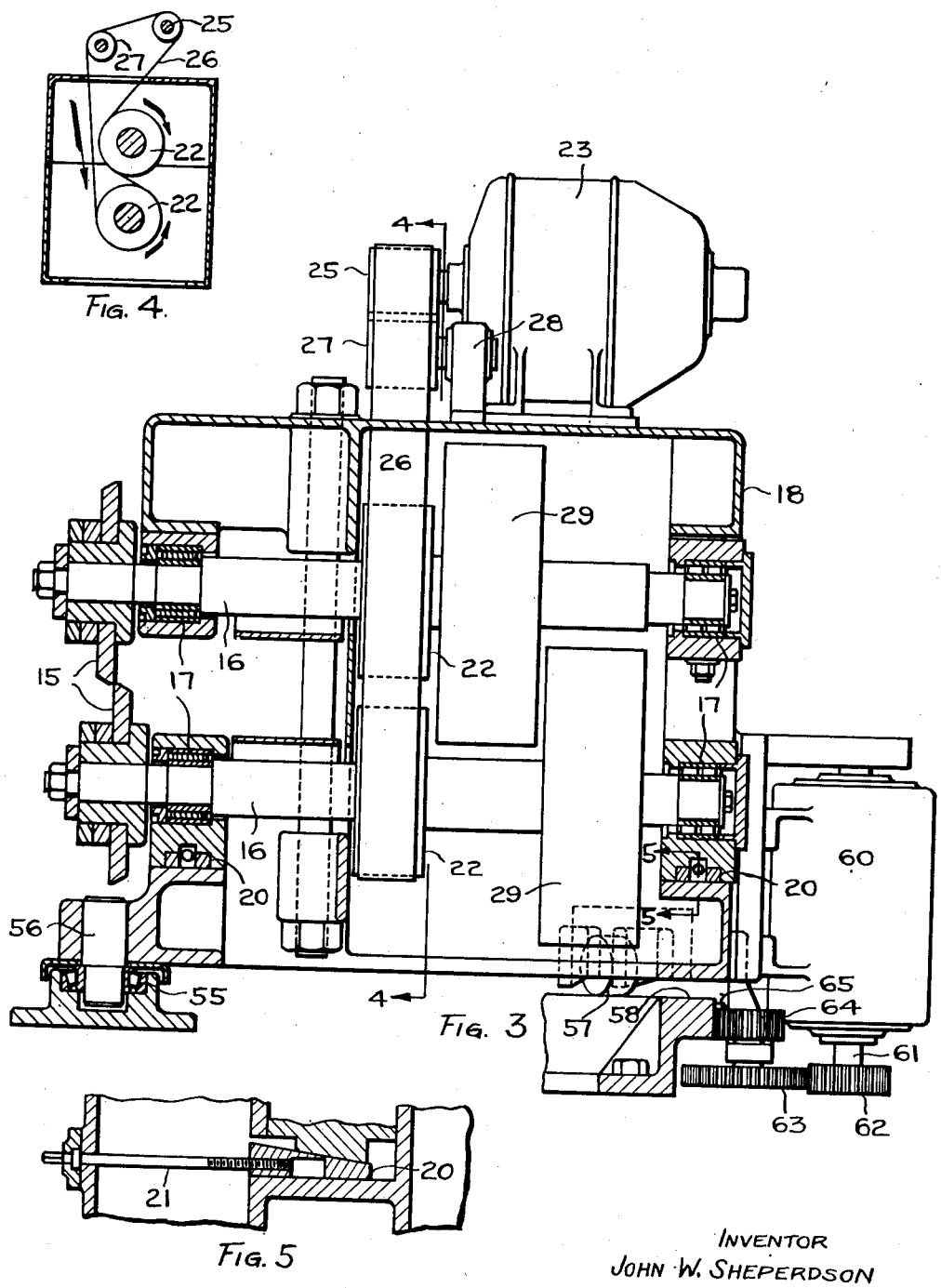
INVENTOR
JOHN W. SHEPERDSON
By Albert G. Blodgett
        ATTORNEY

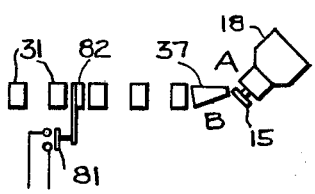
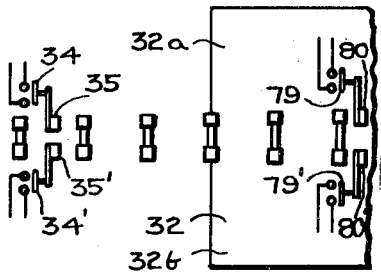
Fig. 6
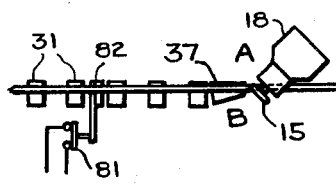
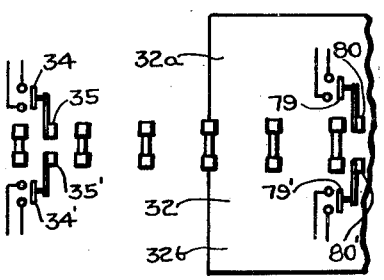
Fig. 7
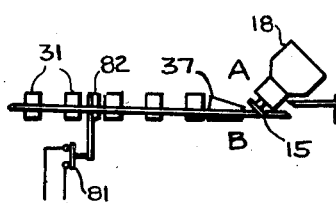
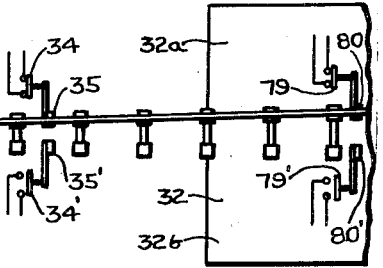
Fig. 8
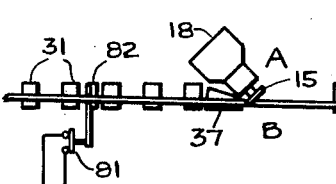
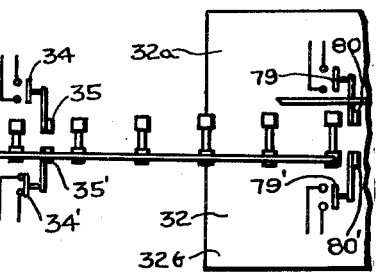
Fig. 9
INVENTOR
JOHN W. SHEPERDSON
BY Albert G. Blodgett
ATTORNEY Patented Aug. 22, 1939

2,170,255

UNITED STATES PATENT OFFICE 2,170,255

SHEARING OF MATERIAL

John W. Sheperdson, Worcester, Mass., assignor to Morgan Construction Company, Worcester, Mass., a corporation of Massachusetts Application May 25, 1937, Serial No. 144,653

11 Claims. (Cl. 164—61)

This invention relates to the shearing of material, and more particularly to an apparatus for making transverse cuts in longitudinally moving bars of material.

One form of apparatus heretofore utilized for this purpose comprises a pair of cooperating shear disks which rotate in a plane positioned at an angle with respect to the direction of stock travel, means being provided to swing the stock laterally between the disks and thus sever the stock. The disks are then separated, the stock is swung back to its original line of travel, the disks are brought together again, and the operation is repeated. In this prior apparatus it has been found necessary to provide a somewhat complicated and expensive construction in order to effect the separation of the disks and their return to operative positions. Furthermore, the successive sheared lengths of stock are all delivered along the same line, and special switching mechanism is required if these lengths are to be directed along different lines, as for example to the opposite sides of a double cooling bed when hot metal stock is being sheared.

Stock is ordinarily conveyed to and from the shear by means of spaced driven rollers. If pieces of a predetermined length are cut successively from the front end of the stock there may be left at the rear end thereof a piece too short to reach from one conveyor roller to the next. This short piece will become stalled, and may cause a cobble when the front end of the next bar comes along. While this problem may be encountered with various types of shears, it is particularly serious with shears of the rotating disk type, since the mechanism which swings the stock laterally requires considerable space in the direction of stock travel and renders it difficult to locate the conveyor rollers close together adjacent to the shear.

It is accordingly one object of the invention to provide a comparatively simple, inexpensive and reliable apparatus for making transverse cuts in longitudinally moving material without interrupting the movement thereof.

It is a further object of the invention to provide a comparatively simple and dependable shear construction including a pair of cooperating rotating shear disks which are arranged to make successive transverse cuts on longitudinally moving material without separating the disks.

It is a further object of the invention to provide a shearing mechanism and a double cooling bed so arranged that successive sheared lengths of stock will be directed to opposite sides of the cooling bed.

It is a further object of the invention to provide a shearing mechanism and associated apparatus adapted to cut successive pieces of a predetermined length from longitudinally moving bars, and so constructed and arranged that the last piece in each bar will always exceed a predetermined minimum length irrespective of the original length of the bar.

With these and other objects in view, as will be apparent to those skilled in the art, the invention resides in the combination of parts set forth in the specification and covered by the claims appended hereto.

In accordance with my invention in its preferred form, I provide a pair of cooperating shear disks which rotate continuously with their cutting edges in a common plane. The longitudinally moving bar of material is forced laterally back and forth between the disks, which effect a transverse severance of the bar during its lateral movement in each direction. Following each severance of the bar the disks are moved into a position such that they are at an obtuse angle with the on-coming portion of the bar. The disks preferably rotate about parallel axes, and the above described movements of the disks are preferably effected by oscillating them about an axis located in the plane of the disks and intersecting their axes. The lateral movement of the bar is preferably effected by means of a suitable guide, and the oscillating movement of the disks may be effected by a power mechanism which is set in operation automatically at the completion of each movement of the guide. The longitudinal movement of the bars is preferably in a horizontal direction, and the disks preferably rotate about horizontal axes. If desired, the shearing mechanism may be associated with a double cooling bed, and the laterally movable guide which cooperates with the disks to effect severance of the bar may also serve to direct the sheared pieces successively to opposite sides of the cooling bed. Lateral movement of the guide to effect severance of a predetermined length of the bar is preferably initiated by a detector device actuated by the front end of the bar and located beyond the shear. In order to avoid a severance which would leave too short a piece at the rear end of the bar, I preferably provide a second detector device located in advance of the shear and arranged to render the first detector device inoperative when the rear end of the bar has approached within a predetermined distance of the shear.

Referring to the drawings illustrating one embodiment of the invention and in which like reference numerals indicate like parts, Fig. 1 is a top plan view of a shearing mechanism;

Fig. 3 is a section on the line 3—3 of Fig. 1;

Fig. 4 is a section on the line 4—4 of Fig. 3;

Fig. 5 is a section on the line 5—5 of Fig. 3;

Fig. 6 is a diagrammatic plan view of the shearing mechanism and associated apparatus, with no stock passing through;

Fig. 7 is a view similar to Fig. 6, showing the stock passing the shear;

Fig. 8 is a view similar to Fig. 6, showing the completion of the first cut;

Fig. 9 is a view similar to Fig. 6, showing the positions of the various parts just prior to the second cut.

Figure 1:
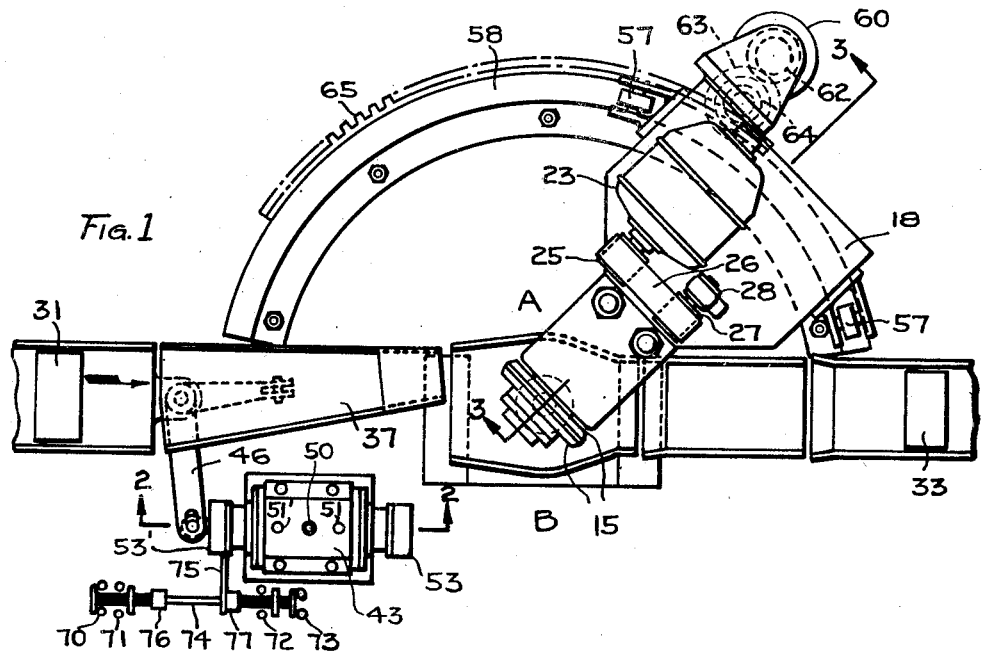

The embodiment illustrated in the drawings comprises a pair of cooperating shear disks 15 arranged with their cutting edges in a common vertical plane. These disks are supported one above the other on the overhung ends of two horizontal shafts 16 (Fig. 3) which are rotatably mounted in suitable bearings 17 in a frame 18. The bearings 17 for the lower shaft 16 are adjustable vertically by means of wedges 20 and manually rotatable screws 21. The disks 15 are rotated continuously, and for this purpose each shaft 16 is provided with a pulley 22. An electric motor 23 having a motor pulley 25 is mounted on the top of the frame 18 with its axis parallel to the shafts 16, and an endless belt 26 passes around the motor pulley 25, over an idler pulley 27 supported by a bracket 28 on the top of the frame 18, and thence around the two pulleys 22 in opposite directions, as shown particularly in Fig. 4. With this construction the disks 15 may be rotated continuously, with the direction of rotation of one disk opposite to that of the other. Each shaft 16 is preferably provided with a flywheel 29 (Fig. 3) to assist in maintaining the speed of the disks during the cutting operation.

The material to be severed, as for example long hot metal bars issuing from a rolling mill, is delivered to the shear disks 15 by means of a series of spaced horizontal rollers 31 (Fig. 6) which may be driven by any suitable means. The severed pieces are delivered from the shear disks to a double cooling bed 32 by means of a series of spaced horizontal rollers 33. These rollers 33 may be driven by any suitable means, and the various parts are so arranged that a severed piece which is directed to one side of the roller centers will remain on that side and eventually be delivered to the corresponding side of the cooling bed 32. It will be understood that this cooling bed may be of any suitable and well-known construction having two sides 32a and 32b, and that it may be provided with the usual kick-off mechanisms to push the bars laterally from the rollers 33. In order to actuate the kick-off mechanisms I may provide a pair of electric switches 34, 34' which are controlled by a pair of flags 35, 35' located in the path of the bar on opposite sides of the centers of the rollers 33. These various parts may be constructed and arranged in a well-known manner so that when the rear end of a severed piece leaves one of the flags 35, 35' and opens the corresponding switch 34, 34', the corresponding kick-off mechanism will be actuated and the piece will be pushed laterally on to the adjacent side of the cooling bed while sliding for some distance longitudinally by reason of its momentum.

Figure 2:
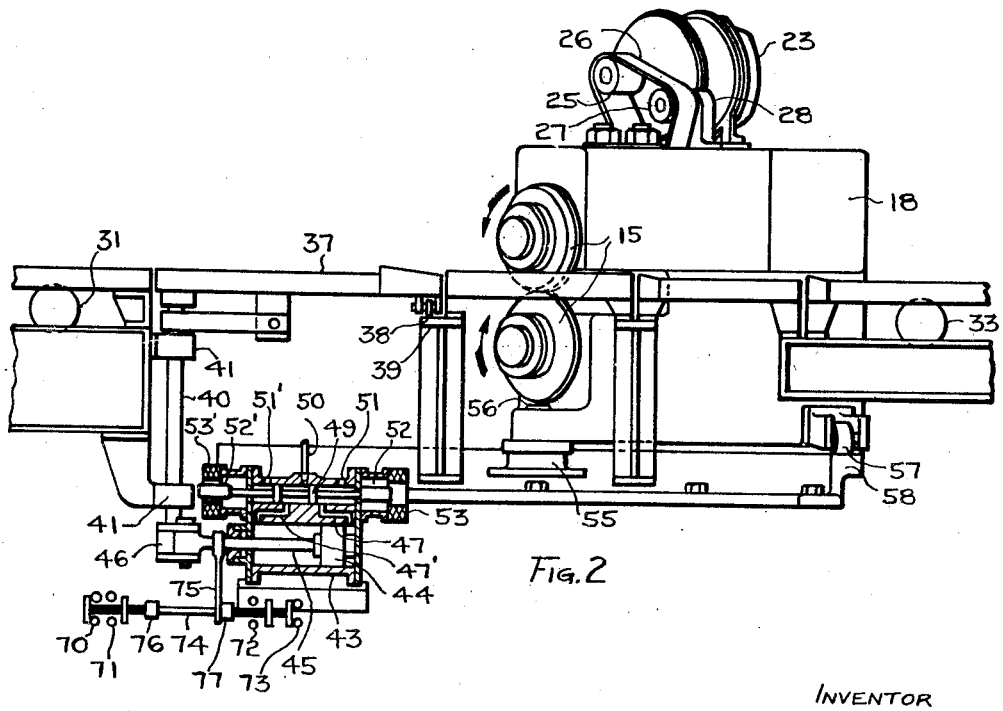
Fig. 2 is a front elevation of the shearing mechanism, with certain parts shown in section on the line 2—2 of Fig. 1.

In order to shear the bar, means is provided to force the bar laterally between the shear disks 15. For this purpose there is shown in Figs. 1 and 2 a guide in the form of a trough 37 which is arranged to swing or oscillate in a horizontal plane. This trough is located directly in advance of the shear disks and in a position to receive the bar as it is delivered by the rollers 31. A small roller 38 is secured to the trough beneath its outlet end and rests on a stationary bracket 39. The inlet end of the trough is supported on the upper end of a vertical shaft 40 which is mounted in bearings 41.

The trough 37 is preferably actuated by a suitable power mechanism, and for this purpose I have shown a motor comprising a horizontal cylinder 43 having a piston 44 slidable therein. A piston rod 45 connects the piston with an arm 46 secured to the lower end of the shaft 40. Ports 47, 47' connect opposite ends of the cylinder with a slidable 4-way pilot valve 49 of the balanced-piston type to which a suitable fluid, such as air, is supplied under pressure through a pipe 50. Exhaust ports 51, 51' are provided in the pilot valve casing. The pilot valve 49 is provided at its opposite ends with plungers 52, 52' which are associated respectively with solenoids 53, 53'. These parts are so constructed and arranged that by energizing solenoid 53' only, the pilot valve will be moved to the position shown in Fig. 2, whereupon air will be admitted through port 47' to the left end of the cylinder 43, while the right end of the cylinder is connected to atmosphere through ports 47 and 51. This will move the piston 44 to the right as shown in Fig. 2, and hold the trough 37 in position to direct the bar to what I may call the "A" side of the shear disks 15 and to the side 32a of the cooling bed. If now the solenoid 53' is deenergized and the solenoid 53 is energized, the pilot valve will be moved to the right in Fig. 2, exhausting air through ports 47' and 51' and admitting high pressure air through port 47. This will force the piston 44 to the left and swing the trough 37 to what I may call the "B" side of the shear disks 15, as indicated in Fig. 8. During the swinging movement of the trough the bar will be forced between the shear disks and severed, and the front end of the next piece will be directed to the side 32b of the cooling bed.

As shown particularly in Figs. 1, 6 and 7, when the trough 37 is in the "A" position the shear disks 15 are arranged at an obtuse angle of approximately 135 degrees with the on-coming portion of the bar. This makes it possible to effect a cut without interrupting the movement of the bar, for the portions of the disks which engage the bar have a velocity component in the direction of longitudinal travel of the bar. Immediately after completion of the cut however, with the trough 37 in the "B" position as shown in Fig. 8, the shear disks will be at an acute angle of approximately 45 degrees with the on-coming portion of the bar, and it will not be possible to effect a second cut in the reverse direction under these conditions since the adjacent portions of the disks have a velocity component toward and perpendicular to the bar. Furthermore, even though it were feasible to reverse the direction of rotation of the disks, a second cut would not be possible, since under those conditions the adjacent portions of the disks would have a velocity component opposite to the direction of longitudinal travel of the bar.

In order to overcome this difficulty and make possible a second cut in the reverse direction, I provide means to move the shear disks through an angle of approximately 90 degrees into the position shown in Fig. 9, whereby they will again make an obtuse angle of approximately 135 degrees with the on-coming portion of the bar. For this purpose I preferably swing the frame 18 about a vertical axis which lies in the plane of the shear disks and intersects their axes of rotation. In the construction illustrated the frame 18 is shown supported in line with the above-described vertical axis by means of an anti-friction bearing 55 (Fig. 3) of the combined radial and thrust type located beneath the shear disks. This bearing 55 is arranged to receive the lower portion of a vertical pin 56 fixed in the frame 18. The frame 18 is provided with two spaced horizontal rollers 57 located at points remote from the vertical pivot pin 56 and resting upon the upper surface of a stationary track 58, this track being shaped as a circular arc with its center on the axis of the pivot pin.

Power means is preferably provided to oscillate the shear frame 18 about the axis of the pin 56, and for this purpose there is shown a reversible electric motor 60 mounted on the shear frame with its shaft 61 in a vertical position (Fig. 3). A pinion 62 is secured to the lower end of the motor shaft 61, and this pinion meshes with a gear 63 which is connected to a pinion 64 coaxial therewith. This pinion 64 meshes with a segmental gear formed by gear teeth 65 (Fig. 1) on the outer face of the track 58. It will be apparent that by operating the motor 60 in opposite directions it will be possible to oscillate the shear frame 18 back and forth between the position shown in Fig. 1 and the position shown in Fig. 9. When the trough 37 is in the "A" position the shear frame should be in the position shown in Fig. 1 before a cut is made, and I shall therefore refer to this as the "A" position of the shear. Similarly, I shall refer to the position shown in Fig. 9 as the "B" position of the shear. In order to stop the motor 60 when the shear frame reaches either of its travel limits, there is provided a suitable geared limit switch of well-known construction illustrated diagrammatically in Fig. 10 and comprising a pair of contacts 67 and a pair of contacts 68. This limit switch is actuated in any suitable manner from the motor 60 so that when the shear frame is in the "A" position the contacts 67 will be closed and the contacts 68 open, and when the shear frame is in the "B" position the contacts 67 will be open and the contacts 68 closed.

The various parts are preferably so arranged that immediately after movement of the trough 37 to either the "A" or the "B" position, the shear frame will be moved automatically to the corresponding position. For this purpose there is shown a switch mechanism comprising four pairs of contacts 70, 71, 72 and 73 so arranged that when the trough is in the "A" position contacts 71 and 72 will be open and contacts 70 and 73 closed, and when the trough is in the "B" position contacts 71 and 72 will be closed and contacts 70 and 73 open. For simplicity of illustration this switch mechanism is shown in Figs. 1 and 2 as comprising an axially slidable rod 74 having a lost-motion connection with the piston rod 45, this piston rod being shown provided with a laterally extending arm 75 arranged to engage alternately abutments 76 and 77 on the rod 74.

The movements of the trough 37 and of the shear frame 18 are preferably controlled automatically so that pieces of a predetermined length will be cut successively from each bar of stock, and yet if a given cut would leave too short a piece at the tail end of the bar to be handled by the conveyor rollers, such cut will be omitted. This result is obtained by utilizing suitably located detector devices arranged to respond to the arrival and departure of the bar. In the embodiment illustrated there is provided a pair of electric switches 79, 79' which are controlled by a pair of flags 80, 80' located in the path of the bar on opposite sides of the centers of the rollers 33, and an electric switch 81 which is controlled by a flag 82 located in the path of the bar in advance of the shear. The switches 79, 79' and 81 are of the normally open type, and arranged to be closed when the corresponding flags are depressed or otherwise actuated by the bar. The distance between the shear disks 15 and the flags 80, 80' should be approximately equal to the lengths of the pieces which are to be cut from the bar, and the distance between the shear disks 15 and the flag 82 should be at least as great as the length of the minimum length which can be handled by the conveyor rollers, i. e. it should ordinarily exceed the distance between the last of the rollers 31 and the first of the rollers 33. The cooling bed 32 should be capable of handling a length of bar equal to the distance between the flag 82 and the flags 80, 80'.

Figure 10:
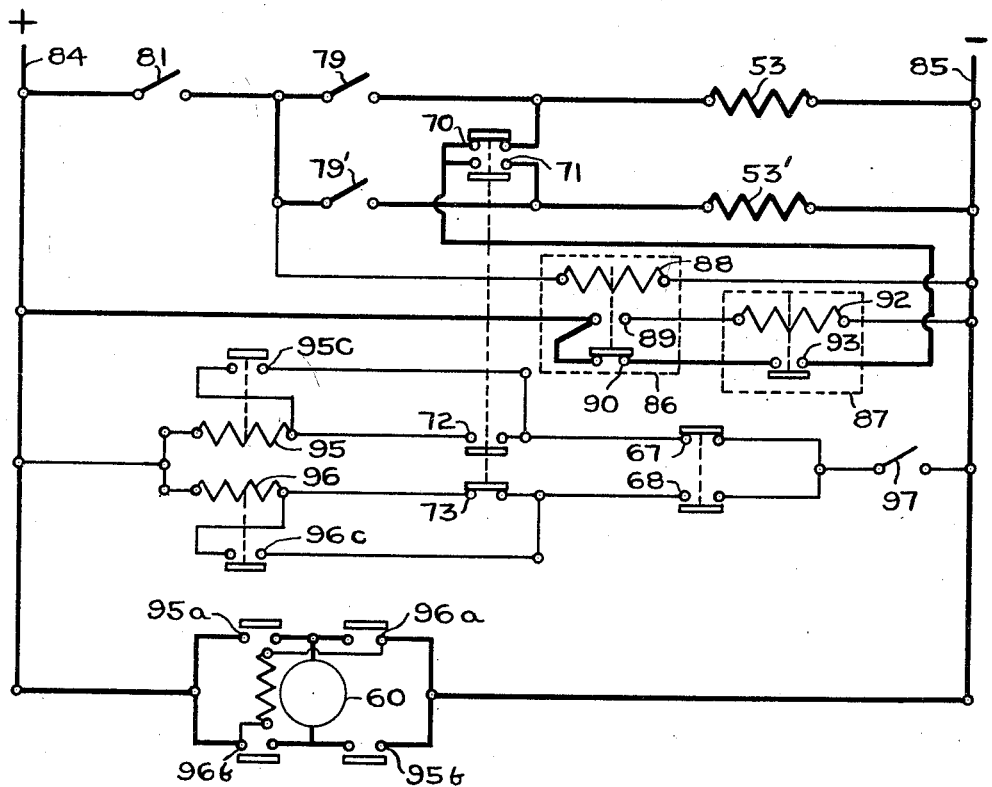
Fig. 10 is an electrical wiring diagram.

Referring now to the electrical diagram shown in Fig. 10, there is provided a direct current supply comprising a positive conductor 84 and a negative conductor 85. The solenoid 53 is arranged to be connected to the supply through switches 81 and 79 in series, and the solenoid 53' is arranged to be connected to the supply through switches 81 and 79' in series. With this arrangement it will be apparent that if a bar of stock is long enough to hold the switch 81 closed by engagement with the flag 82 when the front end of the bar closes switch 79 or 79' by engagement with the flag 80 or 80', the corresponding solenoid 53 or 53' will be energized, causing the pilot valve 49 to be actuated and the trough 37 to swing the bar between the shear disks and sever a piece approximately equal in length to the distance from the shear disks to the flags 80, 80'. It will also be apparent that no cut will be made on a particular bar after its tail end has left the flag 82, since the switch 81 will then be open, and closure of the switches 79 or 79' will not energize the solenoids 53 or 53'. Hence the shear will not make a cut which would leave a piece shorter than the distance between the flag 82 and the shear disks.

It is desirable to swing the trough 37 after the tail end of each bar has passed the shear, so that the first piece cut from the next bar will be directed to the opposite side of the cooling bed. For this purpose I have provided two relays 86 and 87 as shown in Fig. 10. The relay 86 comprises a coil 88, a normally open switch 89, and a normally closed switch 90, and this relay is of the well-known delay type which functions immediately when the coil is energized but delays its operation for a predetermined interval following deenergization of the coil. The delay should be slightly in excess of the time required for the tail end of a bar to travel from the flag 82 to the shear disks. For example, if the bar travels thirty feet per second, and the flag is thirty feet in advance of the shear, a delay of approximately one and one-half seconds will be sufficient. The relay 87 comprises a coil 92 and a normally open switch 93, and this relay is likewise of the type having a delayed operation following deenergization of its coil. However, the delay in the case of the relay 87 is preferably slight as compared with the relay 86, and preferably covers only the time required to effect movement of the pilot valve 49. Ordinarily about one-tenth second is sufficient. As shown in Fig. 10, the coil 88 is connected in series with the flag-switch 81 for energization by the supply 84—85, and the coil 92 is connected in series with the switch 89 for energization by the supply. The mechanically actuated switches 70 and 71 are respectively connected in series with the solenoids 53 and 53', and the current supply to these switches is controlled by the relay switches 90 and 93, which are connected in series. Thus if both the switches 90 and 93 are closed simultaneously, a circuit will be completed through the switch 70 or 71 (whichever happens to be closed) and the corresponding solenoid 53 or 53' will be energized. With this construction the coil 88 will be energized so long as the bar of stock is passing over the flag 82, but when the tail end of the bar leaves this flag, the switch 81 will open, deenergizing the coil 88. One and one-half seconds later (the tail end of the bar having meanwhile cleared the shear) switch 89 will open and switch 90 will close, completing a circuit for one-tenth second through one of the solenoids 53—53' and actuating the pilot valve 49 and the trough 37. Before the trough has completed its movement the switch 93 will have opened as a result of the opening of the switch 89 and the deenergization of the coil 92.

The reversing motor 60 which actuates the shear frame is controlled by suitable line contactors responsive to the mechanically actuated switches 72 and 73 and to the limit switches 67 and 68, the various parts being so constructed and arranged that upon completion of movement of the trough 37 to either its "A" or its "B" position, the motor 60 will immediately start to swing the shear frame and bring it to rest in the corresponding position. As shown in Fig. 10, I have provided a coil 95 which serves when energized to close a pair of switches 95a and 95b, these switches being adapted to complete a circuit through the motor 60 and cause it to swing the shear frame from position "A" to position "B". I have also provided a coil 96 which serves when energized to close a pair of switches 96a and 96b, these switches being adapted to complete a circuit through the motor 60 and cause it to swing the shear frame from position "B" to position "A". The coil 95 is connected in series with the switches 72, 67 and a manually actuated switch 97, while the coil 96 is connected in series with the switches 73, 68 and 97. In order to prevent the stopping of the shear frame between its "A" and "B" positions in case the trough is actuated before the shear frame has completed its movement, I preferably provide a switch 95c arranged to be closed by energization of the coil 95, and a switch 96c arranged to be closed by energization of the coil 96. These switches 95c and 96c are connected in parallel with the switches 72 and 73 respectively. Thus even though one of the switches 72 or 73 is opened by actuation of the trough during movement of the shear frame, nevertheless the circuit through the corresponding coil 95 or 96 will be maintained until the shear frame reaches its travel limit and opens the corresponding limit switch 67 or 68.

The operation of the invention will now be apparent from the above disclosure. Assume that the parts are in the "A" position as shown in Fig. 6, and that bars are to be handled which are too long for the cooling bed 32, so that shearing of the bars is required. Under these conditions switch 97 will be closed manually and will remain closed. When the front end of the first bar passes over the flag 82, as shown in Fig. 7, switch 81 will be closed, energizing coil 88 (Fig. 10), opening switch 90, closing switch 89, energizing coil 92, and closing switch 93. The bar will be directed by the trough 37 to the "A" side of the conveyor rollers 33, and its front end will pass over the flags 35 and 80 in succession, closing the switches 34 and 79. As the switch 79 closes it will energize the solenoid 53, thereby actuating the pilot valve 49 and causing the piston 44 to swing the trough 37 to its "B" position as shown in Fig. 8, at the same time severing the bar by passing it between the shear disks 15. Just prior to the completion of this trough movement the arm 75 (Fig. 1) will strike the collar 76 and slide the rod 74 to the left, thus opening switches 70 and 73, and closing switches 71 and 72. As the latter switch closes, the coil 95 (Fig. 10) will be energized, closing switches 95a, 95b, and 95c, and starting the motor 60 which will move the shear frame from its "A" position to its "B" position as shown in Fig. 9. As the shear frame approaches its "B" position, the switch 68 will close and the switch 67 will open, deenergizing the coil 95, opening the switches 95a, 95b and 95c controlled thereby, and stopping the motor 60. When the tail end of the first piece of the bar leaves the flag 35 and opens the switch 34, this piece will be kicked off laterally in a well-known manner on to the side 32a of the cooling bed, as indicated in Fig. 9, at the same time opening the flag switch 79. In the meantime the front end of the second piece of the bar will be directed by the trough 37 to the "B" side of the conveyor rollers 33, as shown in Fig. 9, and when it engages the flag 80' and closes the switch 79' the solenoid 53' will be energized, causing the trough to swing to the "A" position, thus severing the bar. When the tail end of this second piece leaves the flag 35' and opens the switch 34', this piece will be kicked off laterally on to the side 32b of the cooling bed. These successive cuts with resultant switching of the severed pieces to opposite sides of the cooling bed will continue indefinitely as long as the oncoming bar is in engagement with the flag 82 in advance of the shear.

When the tail end of the bar leaves the flag 82 and opens the switch 81, no more cuts will be made on that particular bar, for subsequent closure of the flag switch 79 (or 79') will not energize the solenoid 53 (or 53'). Hence the last piece in the bar will always be at least as long as the distance between the flag 82 and the shear, and it will not become stalled between conveyor rollers. Of course this piece may be substantially as long as the distance from the flag 82 to the flag 80 (or 80'), but the cooling bed 32 will accommodate such a length. After the last piece has left the flag 82, the resultant opening of the switch 81 will deenergize the coil 88. One and one-half seconds later, the tail end of the bar having in the meantime cleared the shear, the switch 89 will open and the switch 90 will close. This will deenergize the coil 92, and the switch 93 will open one-tenth of a second later. During this slight interval a circuit will be closed through switch 90, switch 93, switch 70 (or 71) and solenoid 53 (or 53'). This will cause the trough 37 and the shear frame 18 to swing to their opposite positions (without cutting any stock), so that the front end of the next bar will be directed to the opposite side of the cooling bed.

If now it is desired to handle a series of bars which are shorter than the distance between flag 82 and flags 80, 80', and hence do not require shearing, the shear driving motor 23 will be stopped and the switch 97 will be opened, thus preventing energization of the coils 95 and 96. The motor 60 cannot be operated under these circumstances, and the shear frame 18 will remain stationary in either its "A" or its "B" position. The trough 37 however will swing to the opposite position for each bar, since the solenoids 53 and 53' will alternately be given a momentary energization one and one-half seconds after the tail end of each bar leaves the flag 82, as explained above. Hence successive bars will be directed automatically to opposite sides of the cooling bed.

It will be clear from the above disclosure that the shearing mechanism is of comparatively simple, rugged and reliable construction. The bar is severed during its lateral movement in each direction between the disks, and there is no necessity for separating the disks as in prior arrangements. Alternate pieces are delivered to opposite sides of the cooling bed, and cuts are omitted when necessary to avoid excessively short pieces at the tail end of the bar.

Having thus described my invention, what I claim as new and desire to secure by Letters Patent is:

1. Shearing apparatus comprising a frame, a pair of rotatable shafts mounted in the frame with their axes horizontal and located in a common vertical plane, means to rotate the shafts continuously in opposite directions, a pair of cooperating shear disks mounted on the shafts, means to move a bar of material longitudinally in a horizontal direction adjacent to the disks, means to move the bar laterally in a horizontal plane between the disks first in one direction and then in the opposite direction without interrupting its longitudinal movement, means to support the frame for a swinging movement about a vertical axis extending through the cutting edges of the disks and intersecting their axes, a stationary gear segment having its center on said vertical axis, an electric motor mounted on the frame, and gearing connecting the motor with the gear segment, said motor being arranged to swing the frame before each such lateral movement of the bar in each direction and bring the disks into a position such that they are at an obtuse angle with the on-coming portion of the bar.

2. In combination with a pair of cooperating shear disks, means to rotate the disks about parallel horizontal axes located in a common vertical plane, means to move a bar of hot metal longitudinally in a horizontal direction adjacent to the disks, guide means to move the bar laterally in a horizontal plane between the disks first in one direction and then in the opposite direction without interrupting its longitudinal movement, means to move the disks, before each such lateral movement of the bar in each direction, into a position such that they are at an obtuse angle with the on-coming portion of the bar, and a double cooling bed arranged to receive the severed pieces of the bar, the said guide means serving to direct successive pieces to opposite sides of the cooling bed.

3. Shearing apparatus comprising a shearing mechanism, means to move a bar of material longitudinally adjacent to the shearing mechanism, means to actuate the shearing mechanism and sever the bar when the front end of the bar has reached a predetermined point beyond the shearing mechanism, and means to prevent severance of the bar after the tail end thereof has approached within a predetermined distance of the shearing mechanism.

4. Shearing apparatus comprising a shearing mechanism, means to move a bar of material longitudinally adjacent to the shearing mechanism, means to actuate the shearing mechanism successively and cut successive pieces of a predetermined length from the front end of the bar, and means to prevent severance of the bar after the tail end thereof has approached within a predetermined distance of the shearing mechanism.

5. Shearing apparatus comprising a shearing mechanism, means to move a bar of material longitudinally adjacent to the shearing mechanism, a detector device located beyond the shearing mechanism and arranged to effect actuation of the shearing mechanism when the front end of the bar reaches the detector device, and a second detector device located in advance of the shearing mechanism and arranged to render the first mentioned detector device inoperative after the tail end of the bar has passed beyond the second detector device.

6. In combination with a shearing mechanism, means to move a bar of hot metal longitudinally adjacent to the shearing mechanism, means to actuate the shearing mechanism successively and cut successive pieces of a predetermined length from the front end of the bar, means to prevent severance of the bar after the tail end thereof has approached within a predetermined distance of the shearing mechanism, and a cooling bed arranged to receive the severed pieces and of sufficient length to accommodate a piece equal in length to the said predetermined length plus the said predetermined distance.

7. In combination with a pair of cooperating shear disks, means to rotate the disks about parallel horizontal axes located in a common vertical plane, means to move a bar of hot metal longitudinally in a horizontal direction adjacent to the disks, guide means to move the bar laterally in a horizontal plane between the disks first in one direction and then in the opposite direction without interrupting its longitudinal movement, a motor arranged to actuate the guide means, means to move the disks, before each such movement of the guide means in each direction, into a position such that they are at an obtuse angle with the on-coming portion of the bar, a double cooling bed arranged to receive the severed pieces of the bar, the guide means serving to direct successive pieces of the bar to opposite sides of the cooling bed, and control mechanism for the motor arranged to cause the motor to move the guide means to the opposite side of the disks after the tail end of the bar has cleared the disks and thereby direct the front end of a succeeding bar to the opposite side of the cooling bed.

8. In combination with a pair of cooperating shear disks, means to rotate the disks about parallel horizontal axes located in a common vertical plane, means to move a bar of hot metal longitudinally in a horizontal direction adjacent to the disks, guide means to move the bar laterally in a horizontal plane between the disks first in one direction and then in the opposite direction without interrupting its longitudinal movement, a motor arranged to actuate the guide means, means to move the disks, before each such movement of the guide means in each direction, into a position such that they are at an obtuse angle with the on-coming portion of the bar, a double cooling bed arranged to receive the severed pieces of the bar, the guide means serving to direct successive pieces of the bar to opposite sides of the cooling bed, and control mechanism for the motor including a detector device located in advance of the shear disks, the control mechanism being so constructed and arranged as to cause the motor to move the guide means to the opposite side of the disks after the elapse of a predetermined time interval following the passing of the detector device by the tail end of the bar, this time interval being sufficient to allow the bar to clear the disks, whereby the front end of a succeeding bar will be directed to the opposite side of the cooling bed.

9. Shearing apparatus comprising a pair of cooperating rotating shear disks, means to move a bar of material longitudinally adjacent the disks, guide means located immediately in advance of the disks and arranged to move the bar laterally between the disks first in one direction and then in the opposite direction without interrupting its longitudinal movement, a motor arranged to move the disks before each such lateral movement in each direction into a position such that they are at an obtuse angle with the on-coming portion of the bar, and control means for the motor responsive to the movements of the guide means.

10. Shearing apparatus comprising a pair of cooperating rotating shear disks, means to move a bar of material longitudinally adjacent to the disks, guide means located immediately in advance of the disks and arranged to move the bar laterally between the disks first in one direction and then in the opposite direction without interrupting its longitudinal movement, a reversible electric motor arranged to move the disks before each such lateral movement in each direction into a position such that they are at an obtuse angle with the on-coming portion of the bar, and a control switch for the motor responsive to the movements of the guide means.

11. Shearing apparatus comprising a frame, a pair of rotatable shafts mounted in the frame with their axes horizontal and located in a common vertical plane, a motor mounted on the frame and arranged to rotate the shafts continuously in opposite directions, a pair of cooperating shear disks mounted on the shafts, means to move a bar of material longitudinally in a horizontal direction adjacent to the disks, means to move the bar laterally in a horizontal plane between the disks first in one direction and then in the opposite direction without interrupting its longitudinal movement, means to support the frame for a swinging movement about a vertical axis extending through the cutting edges of the disks and intersecting their axes, and means to swing the frame before each such lateral movement of the bar in each direction and bring the disks into a position such that they are at an obtuse angle with the on-coming portion of the bar.

JOHN W. SHEPERDSON.